United States Patent [19]

Kelley, Jr.

[11] E Re. 30,815

[45] Reissued Dec. 8, 1981

[54] LIFT TRUCK MAST

[75] Inventor: Wilfred H. Kelley, Jr., Maple Plain, Minn.

[73] Assignee: White Farm Equipment, Oakbrook, Ill.

[21] Appl. No.: 889,894

[22] Filed: Mar. 24, 1978

Related U.S. Patent Documents

Reissue of:

[64] Patent No.: 3,871,494
Issued: Mar. 18, 1975
Appl. No.: 350,621
Filed: Apr. 12, 1973

U.S. Applications:

[62] Division of Ser. No. 55,064, Jul. 15, 1970, Pat. No. 3,768,595.

[51] Int. Cl.[3] ..... B66B 7/02

[52] U.S. Cl. ..... 187/95; 187/9 E; 308/6 R

[58] Field of Search ..... 187/9 R, 9 E, 95; 308/3 R, 3 B, 6 R

[56] References Cited

U.S. PATENT DOCUMENTS

| | | | |
|---|---|---|---|
| 1,978,606 | 10/1934 | Sloane | 198/765 |
| 2,167,154 | 7/1939 | Huffman | 308/6 R |
| 2,517,112 | 8/1950 | Jones | 193/42 |
| 2,973,835 | 3/1961 | Quayle | 187/9 E |
| 3,143,190 | 8/1964 | Knights et al. | 187/9 E |
| 3,204,780 | 9/1965 | Holt et al. | 212/15 |
| 3,213,967 | 10/1965 | Hastings et al. | 187/9 E |
| 3,298,463 | 1/1967 | McIntosh | 187/9 |
| 3,345,676 | 10/1967 | Graber et al. | 16/87.6 R |
| 3,358,791 | 12/1967 | Goodacre | 187/9 E |
| 3,462,028 | 8/1969 | Pi | 187/9 |
| 3,506,092 | 4/1970 | Shinoda et al. | 187/9 |
| 3,556,247 | 1/1971 | Shinoda et al. | 187/9 |

FOREIGN PATENT DOCUMENTS 1807629 6/1969 Fed. Rep. of Germany .

OTHER PUBLICATIONS

"Clarklift Features", Brochure TC-92-656-55M, Clark Equipment Company, Battle Creek, Mich., p. 8 and front and back covers, Jun., 1956.

*Primary Examiner*—James L. Rowland
*Attorney, Agent, or Firm*—Watts, Hoffmann, Fisher & Heinke Co.

[57] ABSTRACT

A lift truck mast having extensible uprights received one within the other. Each upright includes a pair of rail members each of which has a web and flanges such that the members are I-shaped in cross section. The rail members are nested together with the web portion and end flanges of the inner overlapping the web portions and end flanges of the outer. The web portions of one rail member carry rollers which ride on the rear end flanges of the adjacent nested rail member. Each web portion, when viewed in cross section, provides a straight section of uniform thickness and a tapered portion gradually increasing in thickness toward the rear end flange. The rollers are spaced from, but mounted parallel to, the straight web portions so as to rotatably engage the rear end flanges and tangentially contact the tapered web portion. Forward mast bending loads are taken radially by the rollers and side thrust loads parallel to their axes of rotation for improved anti-friction properties and longer wear.

25 Claims, 19 Drawing Figures

LIFT TRUCK MAST

Matter enclosed in heavy brackets [ ] appears in the original patent but forms no part of this reissue specification; matter printed in italics indicates the additions made by reissue.

This is a division, of application Ser. No. 55,064, filed July 15, 1970, *now U.S. Pat. No. 3,768,595.*

BACKGROUND OF THE INVENTION

1. Field of the Invention

The invention pertains generally to the art of elevator mechanisms. More specifically, the invention relates to a sectional lift truck mast of the type having nested uprights. Certain aspects of the invention are directed to a so-called "triplex" mast having three sections. One section is stationary, a second is extensible from the first, and a third from the second so that the mast can reach a greatly-extended height as compared to its collapsed height.

2. Description of the Prior Art

Industrial fork lift trucks normally have a vertically extensible cargo mast mounted on the forward end of the truck. It is generally desirable that the collapsed height of the mast be fairly low to ensure vertical clearance through passageways and access into boxcars or the like. But on the other hand, the maximum fork height should be as great as possible to permit stacking cargo to a considerable height such as in an open yard or warehouse. Thus, the triple sectional or triplex mast is often desirable since it has great height, fully extended, yet a low profile in the collapsed position.

The mast will have a load carriage for lifting the cargo. The load carriage reciprocates on the inner extensible mast section. The distance the load carriage can be raised from its fully lowered position without any extension of the mast occurring, the so-called free lift height, is another important consideration. This allows a cargo to be lifted to the uppermost position consistent with overhead clearance without extending the mast itself, for example, inside of a boxcar where elevation of the mast to increase the cargo height would be prohibited.

The typical mast has a power cylinder which cooperates with a chain lift arrangement for raising the load carriage and sequentially extending the mast sections. One type of commercially available cylinder which can be used with a triplex mast has vertically extensible cylinder rods selectively movable in opposite directions out of the cylinder. In the collapsed position of the mast and the fully lowered position of the load carriage, the cylinder rods are withdrawn and the cylinder is lowered. In raising the load carriage to its free lift height, a first cylinder rod strokes out to the extent permitted by the clearance between the top of cylinder and the mast. Successively the other cylinder rods are extended in raising the mast. In the process the cylinder is elevated. When the last cylinder rod has been fully extended, the mast reaches its maximum overall height and the cylinder has been elevated several feet, tending to obstruct the operator's vision through the mast.

Aside from creating an obstruction, another disadvantage is that the cylinder is not solidly supported on the mast frame. With the mast in a collapsed position, the lower cylinder rod projects out slightly preventing the cylinder from resting solidly on the mast frame.

When the mast is elevated, the cylinder rod extends out raising the cylinder as well as the entire load of the mast. Obviously there is a degree of instability in supporting the mast on a small extended cylinder rod to say nothing of supporting a load of several thousand pounds in an elevated position.

In masts where the power cylinder remains fixed and does not elevate, usually a cylinder is required which is larger than the described elevating type. Since this large cylinder is mounted directly in front of the operator, his view to the front tends to be obstructed by it and other structure such as the hydraulic lines and the load chains. Thus, whether the power cylinder is fixed or movable vertically as with prior art constructions, operators have, at times, been forced to lean out of the side of the truck to see around an obstructing cylinder.

Many mast sections have used generally C-shaped channels for carrying and for engaging rollers. Forward bending loads of the mast are taken by the rollers traveling on the end flange portions of the channels and other rollers, to absorb side thrust loads, are provided. These thrust loads can be considerable when an unbalanced load is on the fork of the load carriage.

The space consumed by most prior thrust arrangements has limited the extent to which mast sections can be nested and, therefore, further contributed to the problems of limited visibility. An arrangement has been proposed to reduce cost and provide nesting through the use of I-beams and cocked forward load absorbing rollers. That is, the axes of the rollers are inclined at a slight non-perpendicular angle with respect to a path of mast section elevational travel. The upper roller is cocked in one direction and lower roller in the opposite direction. Since the rollers are cocked, portions of the forward bending loads are applied to the forward load absorbing rollers at all times as axial rather than radial loads. In addition, the rollers are required to take axial loads resulting from imbalanced side thrust loads. Roller bearings which are designed to withstand axial loads as well as radial loads are more expensive and have shorter lives than those which have only radial loads applied.

Moreover, in the described prior mast arrangement, the axial loading component from the forward bending loads is applied in one direction while the axial component resulting from thrust loads is taken in the opposite direction. Thus there are axial loadings in both directions where cocked rollers are used.

Normally, a system of latches is employed to control the relative movement of mast sections when the mast is extended or collapsed. For example, at some point during the elevation of the load carriage, one latch is tripped to release the first extensible mast section from the outer or stationary section. The extensible section in turn carries a latch which releases the inner section, the latter continuing to elevate until it reaches its full extension.

A variety of latching mechanisms have been proposed in the prior art, but for one reason or another none has been entirely satisfactory. Some have sacrificed free lift height. Others have employed complex latching systems which, aside from the cost, require an inordinate amount of adjustment and maintenance.

Most prior latching devices have contributed to poor bearing conditions for in a typical prior triplex mast, the inner mast section will be fully extended before the latches release the intermediate mast section permitting it to extend. Thus, the inner mast section is fully extended upwardly before the intermediate section is released to commence its upward travel. This means that the bearings between the inner mast section and the intermediate mast section are overworked much of the time since many lifts do not require extension of the intermediate section. In addition these bearings are under their worst loading conditions when the inner section is extended before the intermediate section commences to move. This is because the bearings are moved closer together which is the worst loading condition. The bearing loads are in the best condition with the bearings spaced widely apart. In other words, the loading conditions are a function of the amount of vertical overlap between mast sections. As a result, the bearings interposed between the inner and the intermediate mast sections are excessively loaded and experience excessive wear since there is relatively little vertical overlap in many of the frequently encountered lift heights reached by the extended position of the inner section alone.

SUMMARY OF THE INVENTION

The mast of this invention has a plurality of sections or uprights nested one within the other and extensible relative to each other. Each upright includes a pair of rails which, with the rails of the nested adjacent upright, define parallel, longitudinally extending trackways. Rollers mounted on each rail of at least one upright are adapted to roll in the trackways during raising and lowering of the mast. Each rail is formed, in part, by a transverse portion on which the rollers ride. A second portion extends from the transverse portion at an angle diverging from the rollers. The rollers are in line engagement with the transverse portions and are spaced from the second portion but for small tangential contact such that any side thrust loads are accepted essentially parallel to the roller axes and forward bending loads are taken only radially. As a consequence, axial loads are applied to the rollers in one direction only and normally only under imbalanced load conditions. Accordingly, wear and friction are minimized on both the rails and rollers.

In the preferred form of triplex mast, the rails have a generally I-shaped cross section with a central web section and spaced end flanges. The web section and end flanges of one rail overlap, in a fore and aft direction, the web section and end flanges of the other. The rear half of the web section of each rail is tapered forwardly toward the load at an angle of between 2° and 6° and preferably between 3½°, but may range to a maximum of between 1° and 20°. The front half of the web section, forwardly of the tapered portion, is of constant thickness providing a straight surface parallel to the longitudinal axis of the lift truck.

Rollers at one end of one upright run longitudinally on the rear end flanges of the rails and of the nested upright. Each roller is laterally spaced from the opposite straight web portion and has a peripherally curved outer edge which tangentially contacts the tapered web portion at one point near to the rearward end flange.

A power cylinder rests on a bed plate of the outer upright and is stationary except for slight pivotal movement permitted to accommodate any possible misalignment. The cylinder has vertically extensible cylinder components which, in cooperation with a chain wrap, successively raise a load carriage and thereafter concurrently extend the intermediate and inner uprights. The sequence is provided for by a series of latches which ensure that there is maximum overlap between mast sections during extension and retraction of the mast.

A first latch is pivotally mounted on the intermediate upright on a fore and aft extending axis. In the mast collapsed position, the first latch locks the intermediate upright to the outer. The first latch is unlocked by the extensible cylinder component after it has stroked out to an intermediate raised position corresponding to the position of load carriage at the free lift height. The intermediate upright, and thus the inner which remains locked to it by means of a second latch, can now be raised by the cylinder component.

A second latch is pivotally mounted on a transversely extending axis on the inner upright and locks it to the intermediate until the cylinder component reaches a position corresponding to the highest point of travel of the load carriage in the inner upright. The second latch is then actuated unlocking the inner upright. The latter now becomes attached to the load carriage and starts moving out of the intermediate.

Each latch has dual, oppositely movable elements which simultaneously unlock one part and lock it to another while either raising or lowering the mast. Specifically, each latch comprises a pair of hook elements pivoted on a common shaft and facing in opposite directions. When either latch is pivoted in one direction in raising the mast, one hook element causes the opposite hook element to unlock and the other to lock and vice versa when collapsing the mast.

The chain wrap is such that the load carriage travels at twice the rate of extension of the cylinder components. The arrangement of the latches provides that the inner upright remains locked and travels with the intermediate upright for only a short distance. Thereafter it is unlocked from the intermediate and locked to the load carriage. The intermediate and inner uprights now commence to move relative to each other, the inner rising out of the intermediate at twice the rate of extension of the intermediate since it is locked to the load carriage. The uprights extend simultaneously maintaining a maximum overlapped relationship, inner-to-intermediate-to-outer, which progressively decreases as the mast extends to its full height. Thus loads are distributed on the rollers at near optimum conditions for all mast positions.

Another of the advantages of this invention is to provide an extensible lift truck mast in which the spacing of parts, both in the collapsed and fully raised positions, is such as to provide a maximum viewing area through the mast by the operator eliminating blind spots in the critical areas. This is accomplished, in part, owing to the closer nesting of the rails providing a wider open area of visibility through the mast. But more importantly, the top of the cylinder remains below the line of sight of the operator eliminating the cylinder blind spot problem of some prior art masts.

Another important advantage of the invention is that the uprights are mounted an anti-friction rollers which, owing to the design of the rails, take any side thrust loads parallel to their rotational axes and forward bending loads are taken only radially thereby minimizing wear on the roller assemblies and rails.

A further advantage is the combination of latch mechanisms which allows the maximum free lift height to be obtained before any extension of the mast occurs.

It is also a feature of the invention that the load carriage which travels in the inner upright be mounted on a plurality of sets of rollers in an arrangement that allows the carriage to be supported with the bearings in the best loading conditions while it is traveling but yet permits the carriage to be elevated to a maximum extended height. This is accomplished by extending the load carriage above the inner upright thereby gaining added height while statically supporting the carriage on at least two sets of rollers which remain in the rail trackways.

Another feature of importance is the arrangement of latching mechanisms where the extensible uprights are simultaneously extended even for lifts that do not require the fully raised height of the mast thereby distributing the load on the rollers to minimize friction and wear.

A still further advantage is realized in the design of the I-shaped rails which affords maximum strength to weight ratio at lower tooling costs.

These and other advantages will become apparent by referring to the following description and drawings wherein:

DESCRIPTION OF THE PREFERRED EMBODIMENT

Figure 1:
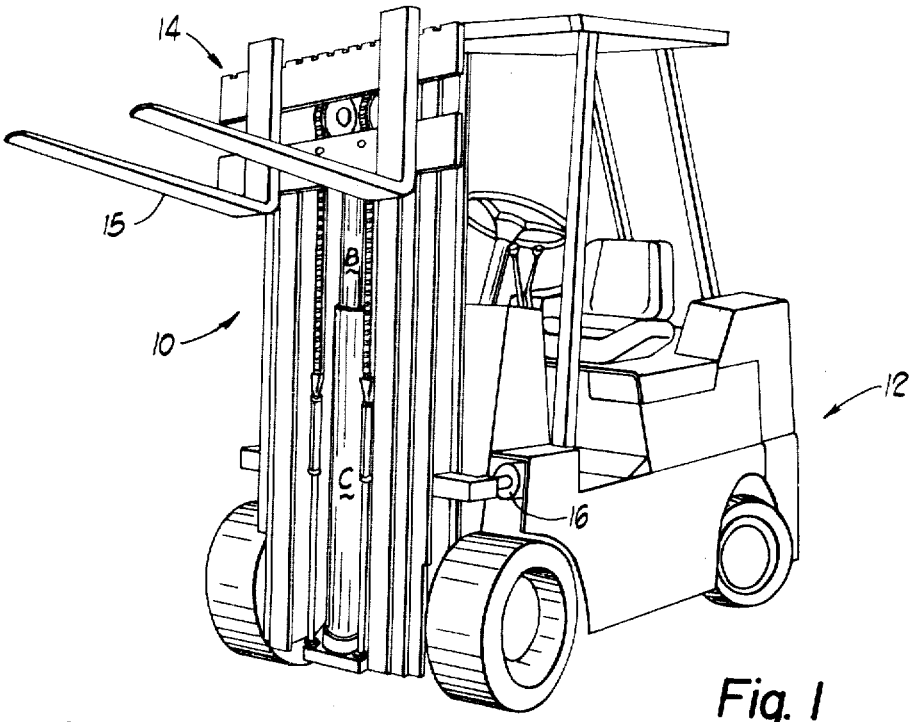
FIG. 1 is a perspective view of a lift truck and mast of the type incorporating the features of the invention where the mast is in a collapsed position and the load carriage is raised to the free lift height.

As shown in the drawings, the present invention will be described in connection with a triple sectional mast assembly 10 for an industrial lift truck 12. The invention contemplates, however, improvements in mast elevator assemblies generally and should not be interpreted as being limited to the description herein, reference being had instead to the appended claims for a comprehension of the scope of the invention.

In FIG. 1, the mast 10 is shown in its collapsed position and the load carriage 14 fully raised to its free lift height, i.e., the maximum elevation achieved by the carriage before any extension of the mast 10 occurs. A fork 15 extends forwardly from the carriage 14 for carrying loads. With the load carriage 14 fully lowered (FIG. 1A) the fork 15 is slightly off the ground. The mast is pivotally mounted at its lower end to the truck frame and by means of a pair of hydraulic cylinders 16 operated from the truck, may be tilted a limited extent in a fore and aft direction.

Figure 3:
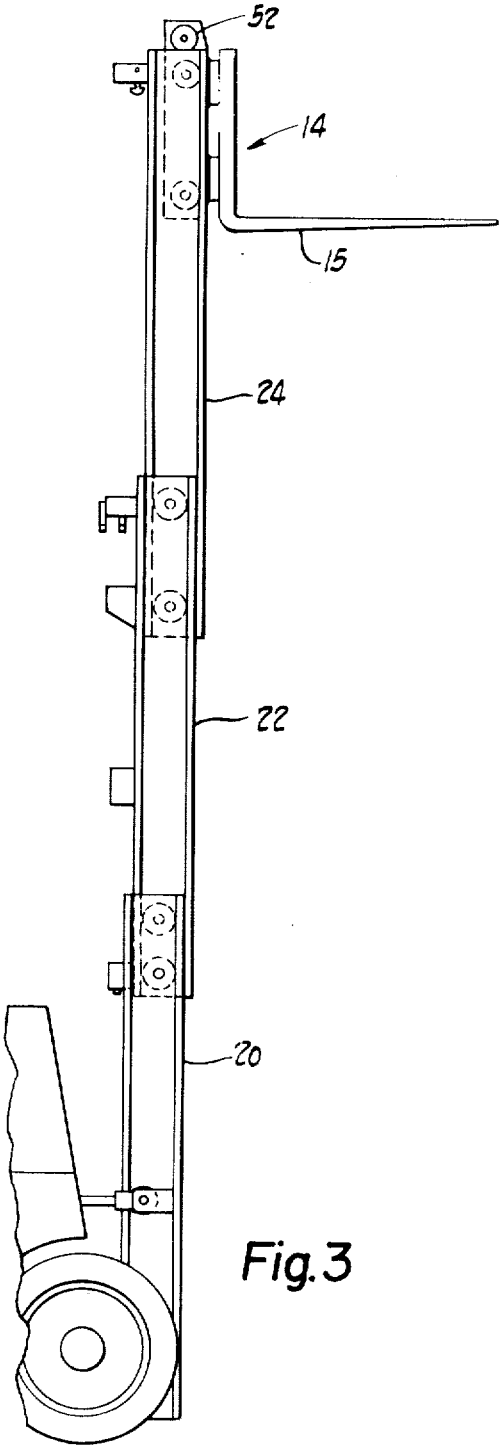
FIG. 3 is a side elevational view and FIG. 4 a rear perspective view of the mast shown in its fully-raised or extended position.
Figure 4:
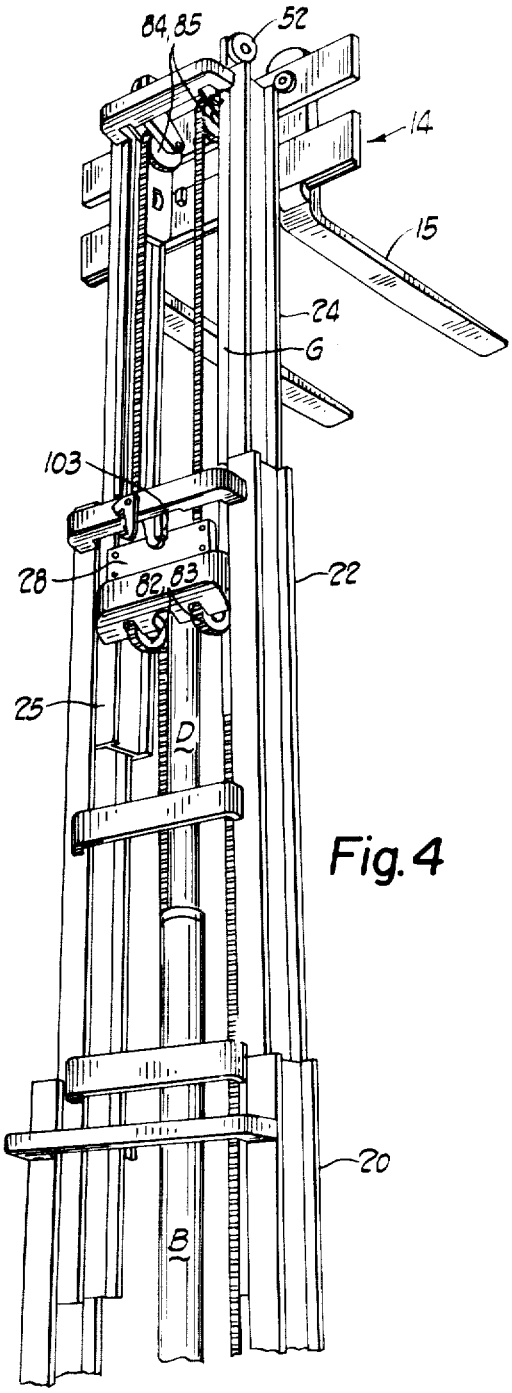

The mast 10 comprises three nested uprights 20, 22, 24. The outer upright 20 is stationary. The intermediate and inner uprights 22, 24 are vertically extensible to a maximum height as depicted in FIGS. 3 and 4. The mast is raised and lowered by means of a chain wrap arrangement, generally indicated at 25 in FIG. 4 and depicted schematically in FIG. 6, which is driven by a hydraulic power cylinder C controlled from the truck. The power cylinder C is permitted limited pivotal movement to accommodate any vertical misalignment and rests on a bed plate at the bottom of the outer upright 20. The cylinder includes a first extensible section B within which telescopes a second extensible section D carrying at the top a sheave block 28 which is guided on the sides in parallel, longitudinally extending guideways G (FIG. 4) secured on the rear of the inner upright 24.

As will be described more in detail hereinafter, a latching mechanism (FIG. 6A) is actuated as the cylinder strokes out and the load carriage is raised to its free lift height (FIG. 1). The latch unlocks the intermediate from the outer upright. The intermediate upright now becomes attached to the sheave block 28 and commences to rise out of the outer upright. Almost simultaneously, a second latching mechanism (FIG. 6B) is actuated as the load carriage reaches its full height in the inner upright 24. At this point the inner upright 24 becomes attached to the load carriage and commences to rise out of the intermediate upright 22. Both the intermediate and inner uprights continue to move relative to the outer upright until the full extension of the mast is reached as shown in FIGS. 3–4.

MAST CONSTRUCTION

Figure 2:
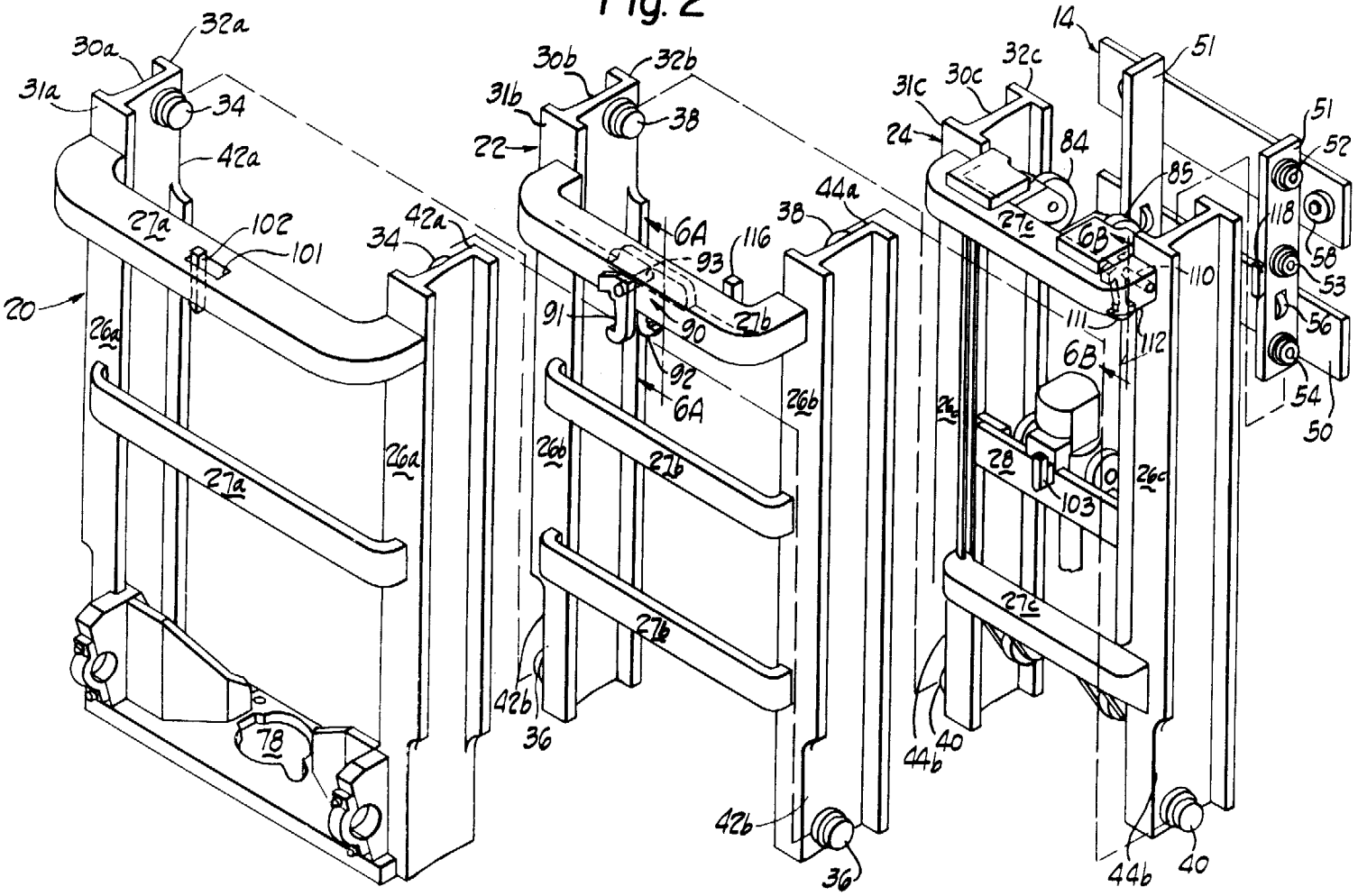
FIG. 2 is a schematic view showing the mast uprights disassembled.

Referring to FIG. 2, the outer, intermediate and inner uprights 20, 22, 24 and the load carriage 14 are shown in a diagrammatic disassembled fashion. As described hereinafter, like parts of different sub-assemblies will be identified with the same numerals with a letter character added to identify a separate sub-assembly.

The uprights 20, 22, 24 each comprise a pair of parallel rails 26a, 26b, 26c. The rails are joined at the rear by a plurality of cross beams 27a, 27b, 27c. Viewed in cross section, each rail is generally I-shaped. There is a central web section 30a, 30b, 30c and spaced end flanges 31a, 31b, 31c and 32a, 32b, 32c. The rails 26a of outer upright 20 are spaced wider apart than the rails 26b of the intermediate upright 22 which in turn are laterally spaced wider than the rails 26a of the inner upright 24. When assembled the uprights roll end-for-end within each other as denoted by the dotted assembly lines in FIG. 2. The web sections 30a, 30b, 30c overlap in a fore and aft direction, outer to intermediate and intermediate to inner as shown in the partial cross sectional view in FIG. 5A. The rear end flanges 31a, 31b, 31c likewise overlap laterally as do the front end flanges 32a, 32b, 32c.

A pair of rollers 34 face inwardly adjacent the upper end of the outer upright 20. The intermediate upright 22 carries two sets of opposed rollers 36, 38, on set 36 facing outwardly at the lower end and the other set 38 facing inwardly at the upper end. The inner upright 24 carries one set of opposed rollers 40 adjacent the lower end facing outwardly.

The forward end flanges 32a of each rail 26a and the rear end flanges 31b of each rail 26b have longitudinal cut-outs, 42a, 42b. The cut-outs 42a face inwardly on the upper end of the outer upright 20 and the cut-outs 42b face outwardly on the lower end of the intermediate upright 22. Likewise, the forward end flange 32b of each rail of the intermediate upright and the rear end flange 31c of each rail of the inner upright 24 are cut out respectively at 44a, 44b. The cut-outs 44a face inwardly at the upper end of the intermediate upright 22 and the cut-outs 44b face outwardly at the lower end of the inner upright 24.

The sets of rollers 34, 36, 38, 40 on each upright are mounted on stud shafts adjacent the upper and lower ends of the uprights leaving a clearance in the cut-outs 42a, 42b, 44a, 44b sufficient to receive the rollers of the nested upright. The cut-outs 42a of the outer upright 20 receives the rollers 36 at the lower end of the intermediate upright 22 as indicated by the dotted assembly lines in FIG. 2. Likewise, the cut-outs 44a at the upper end of the intermediate upright 22 receive the rollers 40 at the lower end of the inner upright.

Figure 5A:
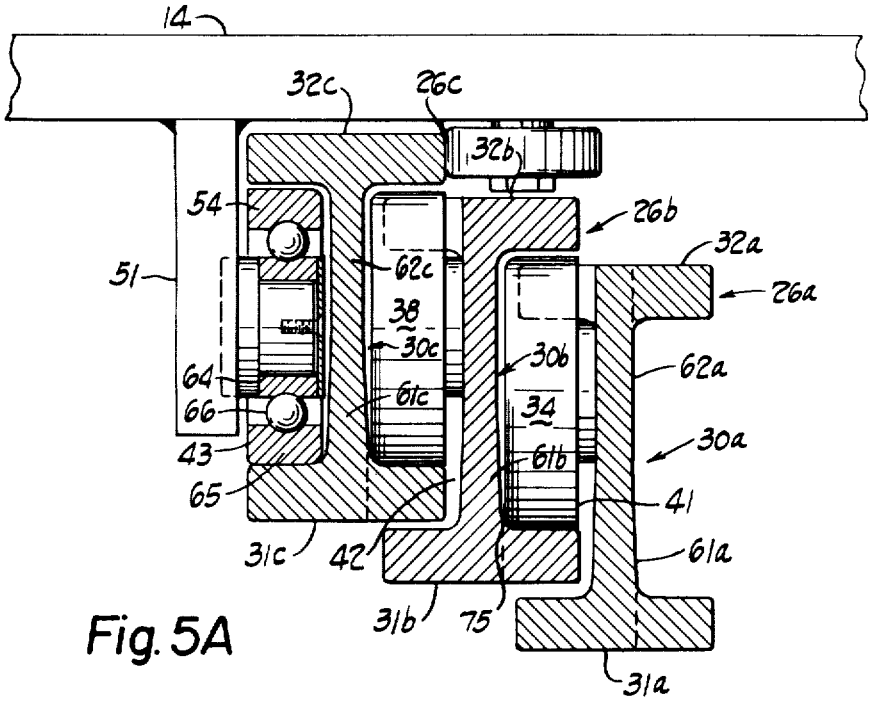
FIG. 5A is a cross sectional view showing the nested relationship of the rails and rollers.

When nested together, as shown in FIG. 5A, the inner rails 26c roll inside the intermediate rails 26b and the intermediate rails in turn roll inside the outer rails 26a which are stationary. The rear end flanges 31c overlap and lie inside of the rear end flanges 31b which in turn overlap and lie inside of the rear end flanges 31a. The front end flanges 32c overlap and lie outside the front end flanges 32b which in turn overlap and lie outside the front end flanges 32a. Each rail when nested with the companion rail forms parallel longitudinally extending trackways, 41, 42 in which the roller pairs 34, 36, 38, 40 ride in raising and lowering the mast as will be described in more detail hereinafter.

The load carriage 14 has upper and lower apron members 50 (FIG. 2) held by vertically parallel members 51. The members 51 carry three opposed sets of rollers 52, 53, 54. The members 51 are laterally spaced to cause the rollers to track within rails 26c of the inner upright 24. A pair of lower side thrust rollers 56 mounted in the vertical members 51 roll against the inside surfaces of web sections 30c and take any side thrusts resulting from imbalanced loads in cooperation with an upper pair of side thrust rollers 58 mounted on the upper apron 50 and which track along the outer edges of the front end flanges 32c of the inner upright 24. It will be apparent that when assembled the carriage 14 reciprocates in the inner upright 24. During travel of the carriage, forward bending loads on the fork 15 are taken by the upper set of rollers 52 riding against the front end flanges 32c of the rails 26c and by the lower set of rollers 54 rolling on the rear end flanges 31c. It will be noted that the bearing loading is advantageously distributed between the most widely spaced pairs of rollers 52, 54. Where the carriage is fully raised (FIGS. 3, 4), the upper rollers 52 project above the top of rails 26c. Static loads are now taken by the roller pairs 53, 54 which remain in the rails 26c. This arrangement allows for a greater overall fork height than would be otherwise possible as well as providing for longer bearing life through better load distribution during carriage travel.

Figure 5B:
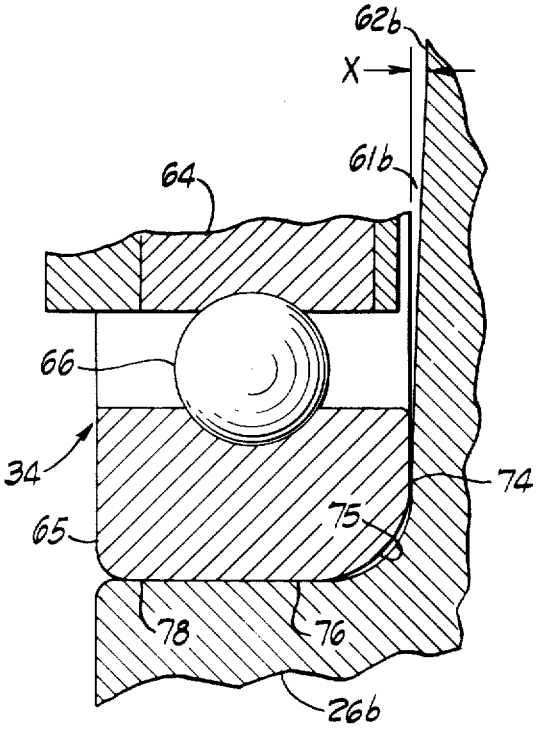
FIG. 5B is a broken out enlarged sectional view showing the roller-to-rail engagement.
Figure 5C:
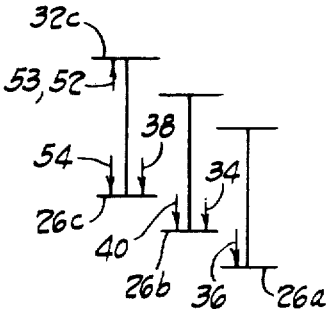
FIG. 5C is a schematic diagram showing the balanced distribution of forward bending loads on the rollers.

The forward bending loads thus transmitted to the inner upright 24 tend to force the rails 26c forwardly at the top and rearwardly at the bottom such that the upper rollers 38 on the intermediate upright 22 and the lower rollers 40 on the inner upright 24 are respectively forced into rolling engagement with the rear end flanges 31c, 31b of the nested rails 26b, 26c. Likewise, the forward bending loads transmitted to the intermediate upright 22 force the rear end flanges 31b of the intermediate rails forwardly against the opposed rollers 34 of the outer upright and the lower rollers 36 of the intermediate rails ride against the rear end flanges 31a of the outer rails. This interaction of forces between the rails and rollers is depicted in FIG. 5C and is a factor in the design which greatly minimizes friction and wear on the rails and rollers as will be more fully explained.

Referring to FIG. 5A, which is a partial cross sectional view of the nested uprights, each rail web section 30a, 30b, 30c will be seen to have a tapered portion 61a, 61b, 61c and a straight portion 62a, 62b, 62c. *The tapered portions 61a, 61b, 61c are joined to respective end flanges 31a, 31b, 31c by a connecting, preferably arcuate surface, forming a corner of the rails. FIG. 5B illustrates the arcuate connecting surface that joins the tapered portion 61b to the end flange 31b in the rail 26b.* The stub shafts which carry the rollers 34, 38 project laterally from the straight portions 62a, 62b on perpendicular axes. The lower rollers 36, 40 project in the opposite direction from the tapered portions 61b, 61c (FIG. 2) on axes perpendicular to the central plane of the web sections. While only the one carriage roller 54 is shown in cross section, each roller on both the carriage and uprights includes an inner race 64 mounted on the stub shaft and an outer race 65 rotatably carried by the inner race 64 on balls 66. The upper and lower rail rollers 34, 36, riding in the outer longitudinally extending trackways 41 lie in a common plane parallel to the plane of upper and lower rollers 38 and 40 in the intermediate trackways 42. The same applies to the load carriage rollers 52, 56, 54 rolling in the inner rails 26c. Each of the respective roller planes is parallel to the longitudinal center plane of the lift truck.

Unlike some prior art arrangements where the rollers are cocked so as to run more or less in the corners of the rails requiring them at all times to take axial loadings in one direction thereby increasing the friction and wear, the present invention contemplates a completely different solution to the problem of friction and wear which has plagued such mast structures heretofore. Referring to FIG. 5B, an enlarged broken out view of the roller 34 and rail 26b is shown, but each roller 36, 38, 40 will be similarly in rolling engagement with its respective rail. The load carriage rollers 52, 53, 54 are spaced from the web sections of rails 26c by the thrust rollers 56, 58. Each roller 34, 36, 38, 40 is spaced from the opposite rail straight portion 62a, 62b, 62c owing to the fact that the tapered web portion 61a, 61b, 61c has a critical angle diverging from the roller. The rollers 34, 36, 38, 40 tangentially contact the tapered web portions at only a single point 74 on the roller edge 75 (FIG. 5B). It has been found that the angle of contact X should be from about 2° to 6° and preferably 3½°, but may range for a maximum of from 1° to 20°. For example, if the angle X gets much beyond 20°, then the nested width of the rails is inordinately increased. This also creates the condition where the application of axial loads becomes appreciably a factor. On the other hand, if the angle X is diminished much below 1°, the possibility of contact by the roller faces on the straight web portions 62a, 62b, 62c increases. Rubbing contact should be reduced to the smallest possible area to minimize wear on the rails and rollers. Ideally, the inclination of the tapered portions 61a, 61b, 61c should be such as to produce a diverging angle X preferably of in the range indicated, 2° to 6° and most satisfactory about 3½°. In this way, any axial thrust loads, if not entirely eliminated, are at least minimized when the rollers are traveling up and down the rails with a balanced loading on the fork.

If an imbalanced load is lifted, only thrust in one direction is taken, not in both directions as with prior art cocked rollers, and this thrust condition is only temporary since any such loads are due to abnormal loading conditions on the fork which disappear when the load is spotted. The radius of edge 75 of the roller will inscribe an arc tangential with the web tapered portion 61a, 61b, 61c and rail end flange 31a, 31b, 31c at 74, [75] *76* providing clearance in the corner, *so that the arcuate connecting surface is spaced from the radius edge of the roller*. The rollers have line engagement with the rear end flanges 31a, 31b, 31c from the point of tangency 76 to the inner edge 78 of the roller. This means that forward bending loads are taken radially and uniformly along a line extending between 76 and 78 greatly increasing roller life and providing for smoother mast operation.

FIG. 5C depicts the interaction of the rollers and rails as described earlier. The forward bending loads are depicted in FIG. 5C as vectors acting on the rails as indicated by the directional arrows. The upper carriage rollers 52 act forwardly against front flanges 32c of the inner upright 26c. However, all of the other roller pairs, i.e., the lower carriage rollers 54 and each of the rail rollers 34, 36, 38, 40 act rearwardly against the rear end flanges 31a, 31b, 31c of the rails 26a, 26b, 26c. The result is a balance of forces on the mast which has the effect of providing smooth, stick-free operation while raising and lowering the mast.

POWER CYLINDER AND CHAIN LIFT ARRANGEMENT

Figure 1A:
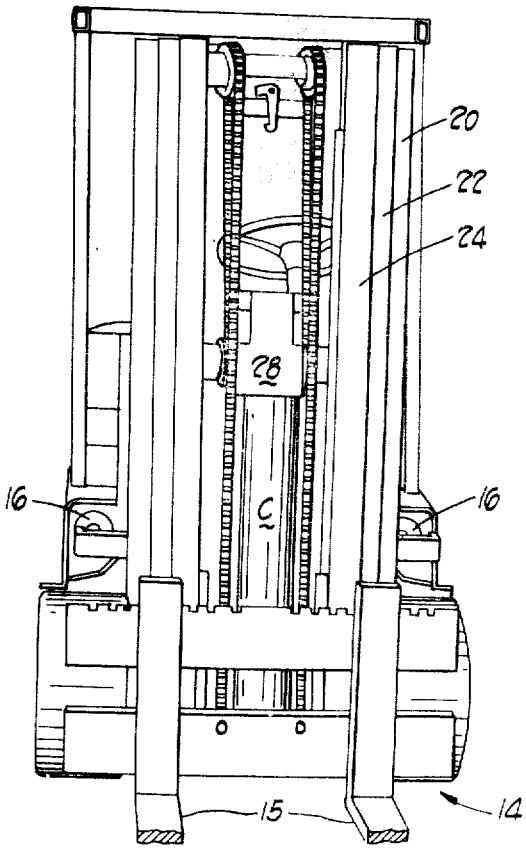
FIG. 1A is a front elevational view of the truck and mast of FIG. 1 showing the load carriage in the lowered position.
Figure 6:
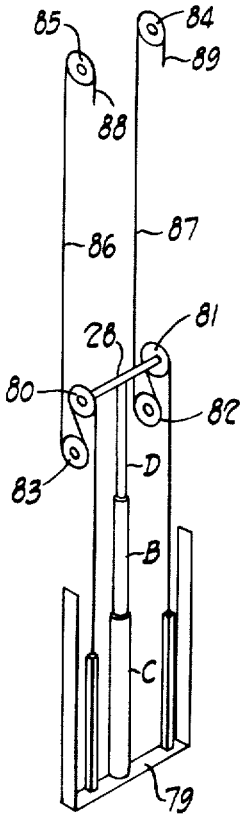
FIG. 6 is a schematic perspective view showing the chain wrap arrangement with the power cylinder fully extended.

Referring to FIG. 6, the hydraulic power cylinder C which is of conventional design, has a cylinder outer housing which is solidly but pivotally mounted on a bed plate 79 which has a recess R (FIG. 2) adapted to receive the base of the cylinder outer housing. The cylinder has a first extensible cylinder component B in which telescopes a second cylinder component D. The components B and D may be successively extended by the operator. The sheave block 28 at the upper end of the cylinder component D carries at the opposite ends thereof sheaves 80, 81. The inner upright 24 also carries adjacent its lower end a sheave block in which are rotatably mounted sheaves 82, 83. Guideways G (FIG. 4) on the rear end flanges of the upright 24 guide the cylinder-driven sheave block 28. Also mounted on the inner upright adjacent the upper end are a pair of sheaves 84, 85 (FIG. 4) in parallel alignment with the sheaves 80, 81, 82, 83. A pair of chains 86, 87 are each anchored at the lower end to the bed plate 78 and extend upwardly over the sheaves 80, 81 thence down and around the sheaves 82, 83 and again upwardly over the sheaves 84, 85 being anchored at the opposite end to the load carriage 14 at 88, 89. It will be appreciated that in FIG. 6, as well as in FIGS. 3 and 4, the cylinder and chain wrap are as they would be with the mast fully extended. That is to say, with the mast fully extended, the cylinder components B, D have each stroked out to the maximum extent and the sheaves 80, 81, 82, 83 are at the closest point of travel to each other and the load carriage 14 is at its uppermost position in the inner upright 24. The mechanical movement of the chain wrap is such that the rate of travel of the load carriage is twice the rate of extension of cylinder components B, D. This allows a shorter cylinder to be used so that the sheave block 28 occupies a position below the line of vision of the operator in the lowered position (FIG. 1A).

LATCH MECHANISM

The invention provides that the extensible mast uprights are locked and unlocked in a novel sequence utilizing to the maximum extent possible, the two-to-one ratio of the chain wrap to provide better load distribution. The latching sequence is such as to ensure that there is always sufficient overlap of the intermediate with the outer upright and inner with the intermediate upright. This also gives maximum strength and rigidity to the mast throughout the upward movement. The present invention provides a novel latch arrangement achieving all of these advantages without sacrificing a high mast strength to weight ratio.

1. First Latch Mechanism

Figure 6A:
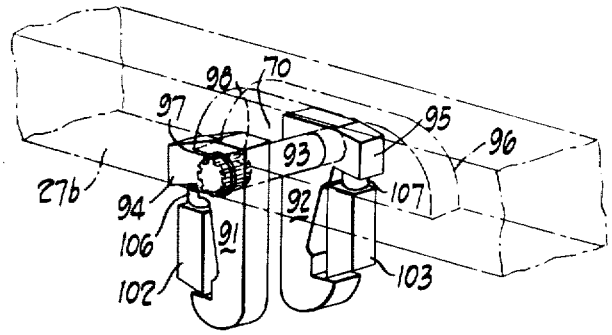
FIG. 6A is a fragmentary perspective view showing the latch mechanism employed between the outer upright and cylinder sheave block for controlling the intermediate upright.

Referring again to FIG. 2, it will be seen that the intermediate upright 22 has mounted in the upper cross beam 27b a latch 90. The latch 90 comprises a pair of oppositely-facing hook elements 91, 92 pivotally mounted on a common fore and aft extending shaft 93 in the longitudinal center plane of the lift truck. As best shown in FIG. 6A, an arm 94 on the hook element 91 projects laterally from the shaft 93 and an arm 95 on the hook element 92 projects laterally in the opposite direction. The hook elements 91, 92 have identical profiles. The hook element 91 pivots on the rear side of the cross beam 27b while the hook element 92 pivots on the front side within a cut-out 92. The hook element 91 is preferably splined onto shaft 93 and held in place by a pair of lock rings 97, 98. Hook element 92 is welded on the shaft at the opposite end. The splined mounting means of securing the hook element 91 has been found to produce a stronger assembly able to better withstand the forces acting on the latch.

As seen in FIG. 2, the cross beam 27a of the outer upright 20 has a vertically extending slot 101. Within the slot 101 and projecting below the cross beam 27a is a first dog 102. A second dog 103 is mounted on the rear side of the sheave block 28 which is shown schematically in FIG. 2 traveling within the inner upright 24.

As shown in FIG. 6A, the first and second dogs 102, 103 are laterally offset so as to be in vertical alignment with the arms 94, 95 Each dog 102, 103 receives a coil spring which yieldably supports a button 106, 107 engageable with the detent 94, 95. Each dog is beveled on the lower end so as to make engagement with the hook element 91, 92. It will be noted that clockwise rotation of the latch 90 simultaneously locks hook element 91 and unlocks hook element 92 and vice versa. The button 106 extends against the arm 94 to yieldably hold the hook element 91 extending through the slot 101 in locked engagement with the beveled end of the dog 102. Similarly, the button 107 yieldably holds the hook element 92 engaged with the dog 103 when the latch is rotated to the counterclockwise position. When dog 103 moves upwardly with the sheave block 28 it engages detent 95 rotating the latch 90, unlocking hook element 91 from dog 102 and locking hook element 92 to dog 103. This will be discussed later in the description of the operation of the mast as a whole.

2. Second Latch Mechanism

Figure 6B:
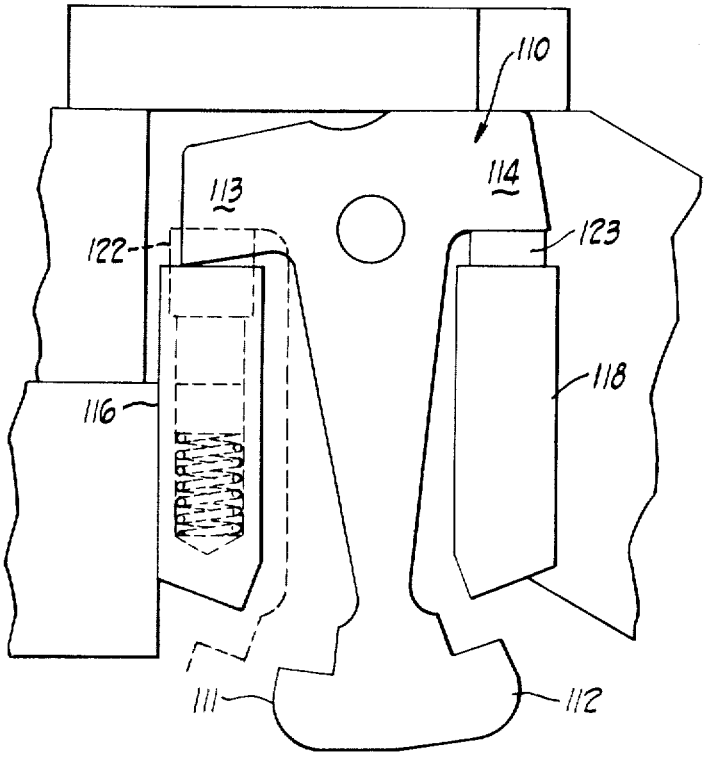
FIG. 6B is a fragmentary view showing the latch mechanism employed between the intermediate upright and load carriage for controlling the inner upright.

Referring again to FIG. 2, a second latch mechanism 110 is pivotally mounted on a transversely extending axis adjacent the upper cross beam 27c of the inner upright 24. Latch 110 pivots in a fore and aft direction in a plane laterally offset from the centerline of the mast. As best shown in FIG. 6B, oppositely facing hook elements 111, 112 are integral with oppositely facing arms 113, 114. The hook element 111 and arm 113 project rearwardly in alignment with a third dog 116 mounted on the upper cross beam 27b of the intermediate upright 22. The hook element and arm 112, 114 project forwardly in alignment with a fourth dog 118 carried on back edge of the right vertical member 51 of the load carriage 14.

Referring to FIG. 6B, it will be seen that the hook element 111 cooperates with the third dog 116 upon rearward movement. The hook element 112 and arm 114 cooperate with the fourth dog 118 upon forward pivotal movement. As with the other dogs, the dogs 116, 118 each receive coil springs which yieldably support buttons 122, 123. The buttons 122, 123 are engageable with the arms 113, 114 respectively and cooperatively pivot the hook elements 111, 112 alternately into locked or unlocked engagement with the dogs 116, 118. The operation is similar to that of latch 90 in that oppositely facing hook elements simultaneously unlock one part of the mast while locking it to another part.

MAST OPERATION

Figure 7A:
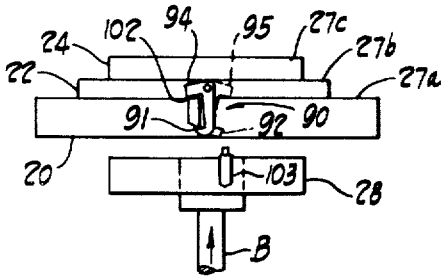
FIGS. 7A–7H are schematic views depicting the sequence of latch operation and mast extension.
Figure 7B:
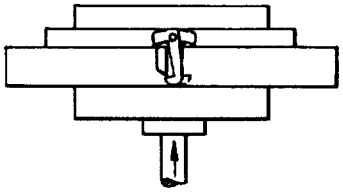
Figure 7C:
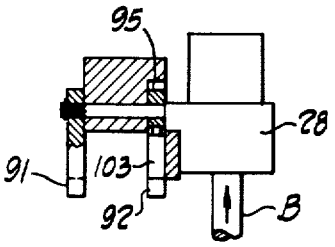

FIGS. 7A-7H are diagrammatic sequence views showing the mast operation. Referring to FIG. 7A, assume that the mast is in the collapsed position with the upper cross beams 27a, 27b, 27c shown nested, one above the other, as they would appear if viewing FIG. 1A from the rear and representing here the uprights 20, 22, 24. The fork 15 is fully lowered. The operator now causes the first cylinder component B to be extended. As it strokes out, the sheave block 28 advances the dog 103 toward the latch 90. The latch 90 at this moment is rotated to the locked position with hook element 91 and arm 94 in locking engagement with the dog 102 such that the intermediate upright is locked to the outer. Also at this moment the second latch 110 is in the position shown in FIG. 7D. That is, the hook element 111 and detent 113 are in locking engagement with the dog 116. Thus the inner upright is locked to the intermediate and the intermediate to the outer.

Figure 7D:
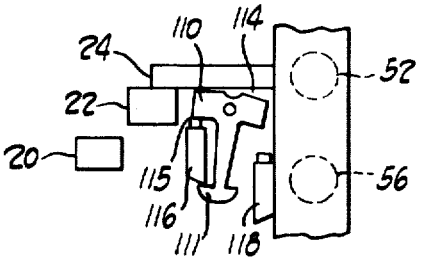

As the cylinder strokes out only the load carriage is free to move. As the sheave block 28 moves vertically to a position corresponding to the free lift height of the load carrier (FIG. 1) it advances the dog 103 into engagement with the arm 95 pivoting the hook element 92 into locking engagement with the dog 103. Hook element 91 simultaneously disengages from dog 102. This is the condition depicted in FIGS. 7B, 7C. At this point, any further upward movement of the sheave block 28 commences to elevate the extensible uprights 22, 24. It is important to note that at the position shown in FIGS. 7B, 7C, the load carriage 14 is already at its free lift height, i.e., the maximum height of the fork without any extension of the mast occurring. It may continue to move upwardly in the inner upright 24 only a few more inches as depicted in FIG. 7D before the latch 110 is tripped releasing the inner from the intermediate upright.

Figure 7E:
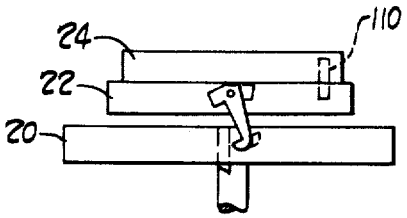
Figure 7F:
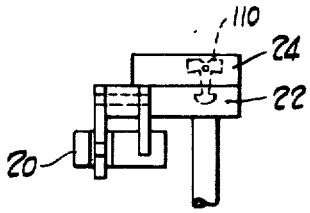
Figure 7G:
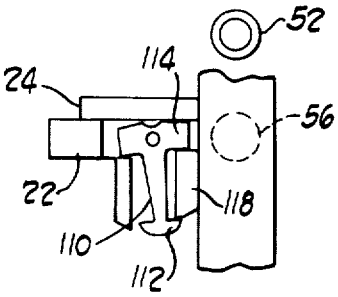

At the position of the uprights shown in FIGS. 7E and 7F, the load carriage 14 will have reached its highest point of travel in the inner upright and any further elevation of the fork 15 comes about as a result of the simultaneous extension of the intermediate and inner uprights rather than movement of the load carriage. As will be seen in FIGS. 7E, 7F the intermediate and inner uprights are no longer locked to the outer upright 20 by the latch 90. Instead, they are locked onto the sheave block 28 and have elevated slightly above the outer upright 20. The load carriage has now reached the point in the inner upright 24 where the dog 118 will trip the latch 110 as shown in FIG. 7G. The dog 118 on the carriage engages the arm 114 pivoting the latch 110 forwardly (counterclockwise as viewed in FIG. 7G). This disengages the inner from the intermediate upright and engages the hook element 112 with the dog 118 locking the inner upright onto the carriage. The inner upright being now locked to the carriage commences to be pulled upwardly out of the intermediate upright by the carriage. As will be seen in FIG. 7G, the upper set of rollers 52 of the carriage have now extended beyond the top of the rails effectively increasing the lift of the fork.

Figure 7H:
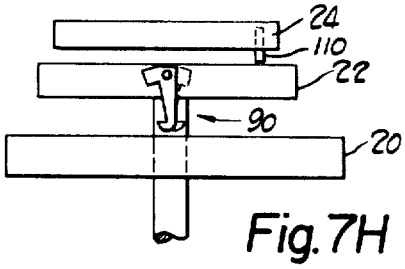

Further elevation of the sheave block 28 by the cylinder continues to raise the intermediate upright 22 at the rate of travel of the cylinder. Simultaneously the inner upright 24, which rises out of the intermediate upright as depicted in FIG. 7H at twice the rate of travel of the intermediate upright, will reach its fully extended position (FIGS. 3, 4) at the same time as does the intermediate.

In lowering the mast the sequence of latching just described will be reversed so that at all times the uprights 20, 22, 24 are positively locked either to the outer upright 20, the cylinder-driven sheave block 28 or the load carriage 14.

Various prior art latching arrangements have been employed in a number of combinations. In one arrangement the inner upright is first locked to the stationary cylinder housing to guard against upward movement of the upright with the carriage in the event the latter should stick or bind. Control of the inner upright is then transferred by means of another latch to the carriage which commences to extend the inner upright out of the intermediate. If the mast is to be fully extended, stop blocks on the lower end of the inner upright engage stop block at the upper end of the intermediate which are effective for raising the latter from within the outer upright as the load carriage continues up. The result is that the rollers on the inner upright are over worked since the majority of loads will be spotted at less than full mast height.

With the invention, from the position shown in FIG. 7G, should the mast continue extending until reaching the overall raised height as shown in FIGS. 3 and 4, there will be a uniform decrease in overlap between the uprights. That is, there is always a relatively equal overlap between the inner and intermediate and between the intermediate and outer uprights owing to the chain wrap and latching sequence. The inner upright 24 moves relative to the intermediate 22 which in turn moves relative to the outer upright 20 such that at the initially extended position depicted in FIG. 7H, the extent of overlap is in excess of 90 percent as between the intermediate and outer uprights and in excess of 95 percent, as between between the inner and intermediate uprights. Thus throughout the elevation or retraction of the mast the loading on the bearings is maintained in the most favorable conditions owing to the fact that the extensible uprights are simultaneously being elevated rather than one followed by the other. This greatly reduces wear and friction on any given set of rollers since all sets are cooperating when any load is lifted above free lift height.

Still in other prior art latching arrangements a plurality of latch elements are arranged in such fashion as to lock the inner to the intermediate upright but no provision is made to lock the intermediate to the outer. Theoretically the forces applied on opposite sides of the load chains should balance and the load carriage should rise with no tendency to cock or bind in the inner uprights. In practice, however, this is not always the case. In masts where reliance is placed on the fact that the weight of the inner upright will prevent the intermediate from moving up prematurely, a considerable weight is required to keep the intermediate upright down. Even so, where extreme side thrust loads occur, it is possible to raise both the inner and intermediate uprights prematurely. This, of course, cannot occur with the present invention since during the free lift period the inner upright is positively locked to the intermediate and the latter in turn is positively locked to the stationary outer upright.

In the present invention the intermediate upright is supported during extension directly by the cylinder which in turn rests on the bed plate of the mast. Thus the intermediate upright always has solid support which increases the mast stability.

To further increase the wear properties of the rails, the surfaces providing rolling engagement for the rollers may be hardened, e.g., by hardening the zone on the rear end flanges 31a, 31b, 31c in rolling contact with rollers 34, 36, 38, 40, 51, 53, 54. Or these surfaces may be provided with a wear strip of harder material than the rails themselves.

Modifications and changes may be made to the invention as will be apparent to those skilled in the art to which it pertains which modifications and changes are to be regarded as reasonable equivalents thereof and are intended to be covered by the appended claims except insofar as limited by the prior art.

What is claimed is:

1. A structural member for use in a multi-sectional mast having a stationary and extensible section, one being laterally offset relative to the other and each extending longitudinally parallel to the axis of the mast and said extensible section being longitudinally parallel to the axis of the mast and said extensible section being longitudinally slidable relative to the stationary section forming therewith longitudinally extending trackways, and anti-friction rollers carried on at least one of said sections adapted to roll in said trackways when extending or retracting one section relative to the other, said structural member being adapted to form a portion of said trackways and comprising, a web portion for defining a longitudinally extending side of said trackways and having a surface inclined to *and tangentially contactable by an edge surface of* the rollers in said trackways *and then* diverging, in cross section, on a line from [a] *the* point of tangency with said rollers and joining a straight surface at an angle of between 1° and 20° relative thereto, said straight surface extending perpendicularly to the axis of said rollers and said inclined surface and straight surface being laterally spaced from and out of contact with said [rollers] *roller edge surface, so that a clearance is provided between said web portion and said roller* except at said point of tangency on the inclined surface thereby minimizing any tendency for axial loading of said rollers.

2. A structural member according to claim 1 wherein said inclined surface diverges at an angle of between 2° and 6°.

3. A structural member according to claim 2 wherein said inclined surface diverges at an angle of approximately 3½°.

4. A structural member according to claim 1 wherein, viewed in cross section, said member has transversely extending end flanges on said web portion forming a generally I-shaped cross sectional configuration and one portion of one end flange joining said inclined surface of the web portion for providing a rolling surface for said rollers and adapted to transmit radial loads thereto.

5. A structural member according to claim 4 wherein the portion of said end flange for providing rolling engagement with the rollers is hardened during the manufacture of said structural member to a greater extent than the rest of said member.

6. A structural member according to claim 5 wherein said portion of the end flange for providing rolling engagement with the rollers is provided with a wear surface of greater hardness than the remainder of said structural member.

7. A structural member having an I-shaped cross section for use in a multi-sectional mast having fixed and extensible mast sections adapted to nest one within the other defining parallel, longitudinally extending trackways and anit-friction rollers received in said trackways for supporting the extensible mast section for movement relative to the fixed mast section, said structural member comprising a web having a tapered portion joined by a straight portion, *said straight portion extending perpendicularly to the axes of said rollers,* and a pair of end flanges, one being integrally formed with said tapered portion and the other with said straight portion and each extending transversely thereto, the one end flange formed with the tapered portion adapted to provide a rolling surface for said rollers, and said tapered portion inclined away from said rollers [and] joining said straight portion at an angle of between 1° and 20° [providing a space between the rollers and said straight and tapered portions from a point of tangency on said tapered portion to said other end flange] *and joined to said one end flange by an arcuate surface, said tapered and straight portions and said arcuate surface each being spaced from each of said rollers except at points of tangency between an edge surface on each one of said rollers and the tapered portion.*

8. A structural member according to claim 7 wherein said tapered portion diverges at an angle of between 2° and 6°.

9. A structural member according to claim 8 wherein said tapered portion diverges at an angle of approximately 3½°.

10. An extensible mast having collapsed and extended positions, comprising:

a. inner and outer mast sections nested inner within the outer and being relatively longitudinally extensible;

b. each of said mast sections including two parallel laterally spaced rail members;

c. said rail members of at least one of said mast sections carrying a plurality of rollers mounted for rotation about parallel axes;

d. each of said rollers defining a peripheral surface and an end surface joined by a curved interconnecting surface;

e. said rail members of said other mast section defining track surfaces engageable with said peripheral surfaces, and defining inclined surfaces adjoining said track surfaces and tangentially contactable with [the junctures of] said interconnecting [and said end] surfaces of said rollers to absorb thrust loads; and, f. said inclined surfaces being spaced from *each of* said rollers except at the points of tangency with said [end] *interconnecting* surfaces *so that a clearance is provided between the interconnecting surfaces and corners of said rail members.*

11. The mast of claim 10 wherein said track surfaces extend in planes paralleling said axes of said rollers, and said peripheral roller surfaces are cylindrical surfaces concentric about said axes.

12. The mast of claim 10 wherein said end surfaces of said rollers extend in planes perpendicular to the axes of said rollers, and said inclined surfaces are inclined at angles relative to said end surfaces within the range of about 1° to 20°.

13. The mast of claim 12 wherein said angles are within the range of about 2° to 6°.

14. The mast of claim 10 wherein said inclined surfaces are inclined at angles relative to said end surfaces within the range of about 1° to 20°.

15. The mast of claim 14 wherein said angles of inclination are within the range of about 2° to 6°.

16. The mast of claim 15 wherein said angles are about 3½°.

17. The mast of claim 10 wherein:

a. each of said rail members includes a pair of spaced end flanges connected by a web;

b. said webs and said end flanges of said inner section rail members overlap said webs and said end flanges of said outer section rail members;

c. said track surfaces are formed on said end flanges of said other mast section rail members; and d. said inclined surfaces are formed on said webs of said other mast section rail members.

18. The mast of claim 17 wherein said points of tangency are located [radially inwardly on said end surfaces] from [said] *the* junctures of said [peripheral] *interconnecting* and end surfaces, whereby no contact is made between said inclined *and connecting web* surfaces and said rollers, at [said] *the* junctures *of said interconnecting and end surfaces.*

19. The extensible mast of claim 17 wherein:

a. said rollers include a first pair of rollers mounted on the webs of the outer section rail members, and a second pair of rollers mounted on the webs of the inner section rail members;

b. each of said rail members has an end flange defining one of said track surfaces; and c. each of said rail members has a web defining one of said inclined surfaces.

20. The mast of claim 17 wherein each of said webs which define one of said inclined surfaces has, in cross section, a region of substantially uniform thickness extending toward one of the integrally formed end flanges, and a region of increasing thickness extending toward the other integrally formed end flange, said region of increasing thickness defining said one inclined surface.

21. The mast of claim 17 additionally including a load carriage supported on one of said mast sections and including:

a. a pair of parallel, longitudinally extending load carriage support members laterally spaced from and overlapping load carriage trackways defined by the rail members of said one mast section;

b. first, second and third opposed pairs of rollers rotatably carried on said load carriage support members and received in said load carriage trackways for rolling engagement with said one mast section rail members when reciprocating said load carriage;

c. said first pair of rollers mounted above the second pair and the second pair above the third; and, d. said first and third pairs of rollers primarily taking the dynamic fork loads during reciprocation of the load carriage throughout the length of said load carriage trackways, said first pair of rollers extending out of said load carriage trackways in the fully raised position of said load carriage free of any loading, and said second and third pair of rollers then cooperating in taking the static fork loads whereby bearing loading conditions are improved and the maximum fork height is increased.

22. A lift truck mast according to claim 21 wherein said load carriage support members carry side thrust rollers rotatably mounted on fore and aft extending axes to rotatably engage the webs of said one mast section rail members during reciprocation of the load carriage thereby isolating the other rollers from side thrust loads.

23. An extensible lift truck mast, comprising:

a. inner and outer mast sections nested inner within the outer and being relatively longitudinally extensible;

b. each of said mast sections including laterally spaced rail members;

c. each of said rail members having spaced end flanges connected by a web;

d. said webs and said end flanges of said inner section rail members overlapping said webs and said end flanges of said outer section rail members to define longitudinally extending trackways;

e. said rail members of at least one of said mast sections carrying a plurality of rollers mounted for rotation about parallel axes, said rollers each having a peripheral surface and an end surface joined by a curved interconnecting surface;

f. said rail members of the other of said mast sections having track surfaces defined on its end flanges for engaging said peripheral surfaces of said rollers;

g. said webs of said other section rail members having cross sections of increased thickness near said track surfaces *and joined to said track surfaces by a connecting surface*, said increased thickness cross sections defining inclined surfaces that extend into tangential contact with the *interconnecting surfaces near the* junctures of said interconnecting and said end surfaces at angles within the range of about 1° and 20° relative to said end surfaces, *and said web connecting surface being spaced from said rollers.*

24. The mast of claim 23 wherein said angles are within the range of about 2° and 6°.

25. The mast of claim 24 wherein said angles are about 3½°.

* * * * *

UNITED STATES PATENT AND TRADEMARK OFFICE

CERTIFICATE OF CORRECTION

PATENT NO. : RE 30815

DATED : December 8, 1981

INVENTOR(S) : WILFRED H. KELLEY, JR.

It is certified that error appears in the above—identified patent and that said Letters Patent is hereby corrected as shown below:

Column 15, line 48, after "located", insert --on said interconnecting surfaces near--.

Signed and Sealed this

*Sixth* Day of *July 1982*

[SEAL]

*Attest:*

GERALD J. MOSSINGHOFF

*Attesting Officer*

*Commissioner of Patents and Trademarks*